United States Patent [19]

Thorndyke

[11] Patent Number: 4,701,086

[45] Date of Patent: Oct. 20, 1987

[54] TRANSPORTATION VAN HAVING LOAD ELEVATING PLATFORM LOCATED THEREIN

[75] Inventor: Robert J. Thorndyke, Oshawa, Canada

[73] Assignee: Atlantis Projects Inc., Oshawa, Canada

[21] Appl. No.: 869,353

[22] Filed: Jun. 2, 1986

[30] Foreign Application Priority Data

Feb. 10, 1986 [CA] Canada .................................. 501512

[51] Int. Cl.$^4$ ............................................. B60P 3/08
[52] U.S. Cl. ..................................... 410/26; 105/371; 296/1 A
[58] Field of Search ................... 410/26, 24; 105/371, 105/370, 340; 206/577, 335; 108/20, 106, 2; 312/352; 296/1 A

[56] References Cited

U.S. PATENT DOCUMENTS

| 1,171,777 | 2/1916 | Enders | 105/371 |
| 3,043,454 | 7/1962 | Butler et al. | 410/26 |
| 3,101,680 | 8/1963 | Raab et al. | 410/26 |
| 3,405,661 | 10/1968 | Erickson et al. | 105/371 |
| 3,606,514 | 9/1971 | Katins | 312/352 |
| 3,720,437 | 3/1973 | Lambert | 296/1 A |
| 4,351,245 | 9/1982 | La Porte | 108/2 |

Primary Examiner—James T. McCall
Attorney, Agent, or Firm—Fetherstonhaugh & Co.

[57] ABSTRACT

A double-deck transportation vehicle has an elevator platform proportioned to extend across the cargo compartment which is mounted on guide rails for vertical movement between a lowered position, an intermediate position and a fully elevated position. When in the lowered position, the platform is located at the floor level. When in the intermediate position, the platform is spaced from the floor and from the roof of the van to provide load storage compartments above and below the platform. When in the fully elevated position, the platform is raised to about the ceiling level. The platform drive mechanism is mounted in a drive compartment which is located within the platform. Elevator cables extend from the drive mechanism to anchor points located adjacent the upper end of the guide rails. The elevator cables extend within the cargo compartment of the van and are not exposed at the exterior of the van. A latching mechanism is provided for releasably latching the platform in the intermediate position.

5 Claims, 7 Drawing Figures

TRANSPORTATION VAN HAVING LOAD ELEVATING PLATFORM LOCATED THEREIN

This invention relates to transportation vehicles. In particular this invention relates to double-deck transportation vehicles.

PRIOR ART

Double deck transportation vehicles for use in transporting automobiles have been previously proposed. One such transportation vehicle is described in U.S. Pat. No. 2,432,228 dated Dec. 9, 1947, S. De Lano. In this device, the upper deck is a permanent fixture and vehicles are loaded into the upper deck using an inclined ramp.

An elevator platform for use in raising a load to the upper deck of a transport vehicle is described in U.S. Pat. No. 2,659,318 dated Nov. 17, 1953, C. K. Steins et al. In this mechanism, an elevator is used to raise a support platform to an elevated position in which it is releaseably locked. The elevator mechanism is then lowered and the vehicle which is to be stored in the compartment below the raised platform is then positioned in the car. This device is located at the centre of the length of a freight car and includes a turntable which serves to locate the load in the required position for elevating. A recess is formed in the bottom wall of the freight car for the purposes of accommodating the turntable and elevator mechanism. The wrench which is used for the purposes of raising and lowering the elevator mechanism is located below the floor of the freight car and is exposed to the elements.

The De Lano transporting vehicle and the Stein's freight car are both specifically designed for the purposes of transporting automobiles. The transportation of automobiles is generally, however, a one-way transportation in that the transportation vehicle is loaded at the automobile manufacturing plant and the vehicles are transported to various distributors. The transportation vehicles then return empty to the automobile manufacturing facility. This practice increases freight charges for the delivery of automobiles.

Large transportation vans are frequently used for the purposes of transporting components to and from various automobile manufacturing facilities, however, without double-decking facilities, these vans cannot be efficiently used for the purposes of transporting vehicles.

Despite the fact that the use of double-deck transportation vehicles has been proposed many years ago as indicated by De Lano, such vehicles are not presently in use and it is believed that it is the lack of versatility, maintenance difficulties and complexity of the mechanisms which contribute to the fact that such devices are not presently in use.

It is an object of the present invention to provide a transportation van which can be selectively arranged to provide single or double deck shipping compartments.

It is a further object of the present invention to provide a transportation van having an elevator platform for elevating a load and storing the load in the elevated position, which platform incorporates its own elevator drive mechanism.

SUMMARY OF INVENTION

According to one aspect of the present invention, a transportation van comprises a transportation van comprising;

(a) a road going van body having a cargo compartment which is open at one end and which has a generally planar floor, a pair of oppositely disposed upright side walls and a top wall, an elevator platform proportioned to extend across the cargo compartment between said side walls, said elevator platform having a drive compartment formed therein, guide means mounted on said side walls and cooperating with said elevator platform for guiding the movement of the platform with respect to the compartment, extensible ram means located in said drive compartment of said platform, one end of said ram means being secured to said platform and the other end being movable with respect to said platform, elevator cable means having one end anchored with respect to said van body and its other end secured with respect to said elevator platform, said other end of said ram means engaging said elevator cables to cause said platform to move to and fro between a lowered position at the floor of the van, an intermediate position spaced above the floor and an upper position proximate the top wall of the cargo compartment, latch means carried by said platform and operable to releaseably latch said platform in said intermediate position so as to be capable of supporting a load when locked in said intermediate position.

BRIEF DESCRIPTION OF DRAWINGS

The invention will be more clearly understood after reference to the following detailed specification read in conjunction with the drawings wherein.

Figure 1:
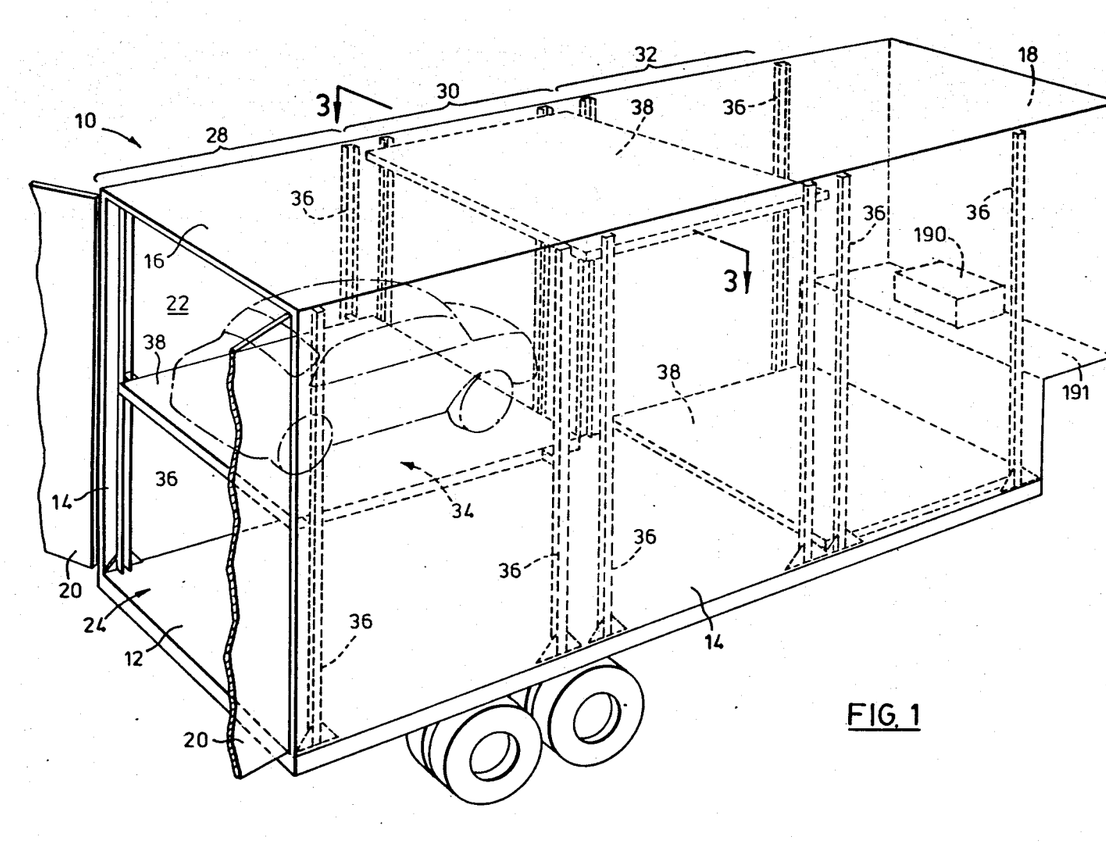
FIG. 1 is a pictorial end view of a transportation van according to an embodiment of the present invention.
Figure 2:
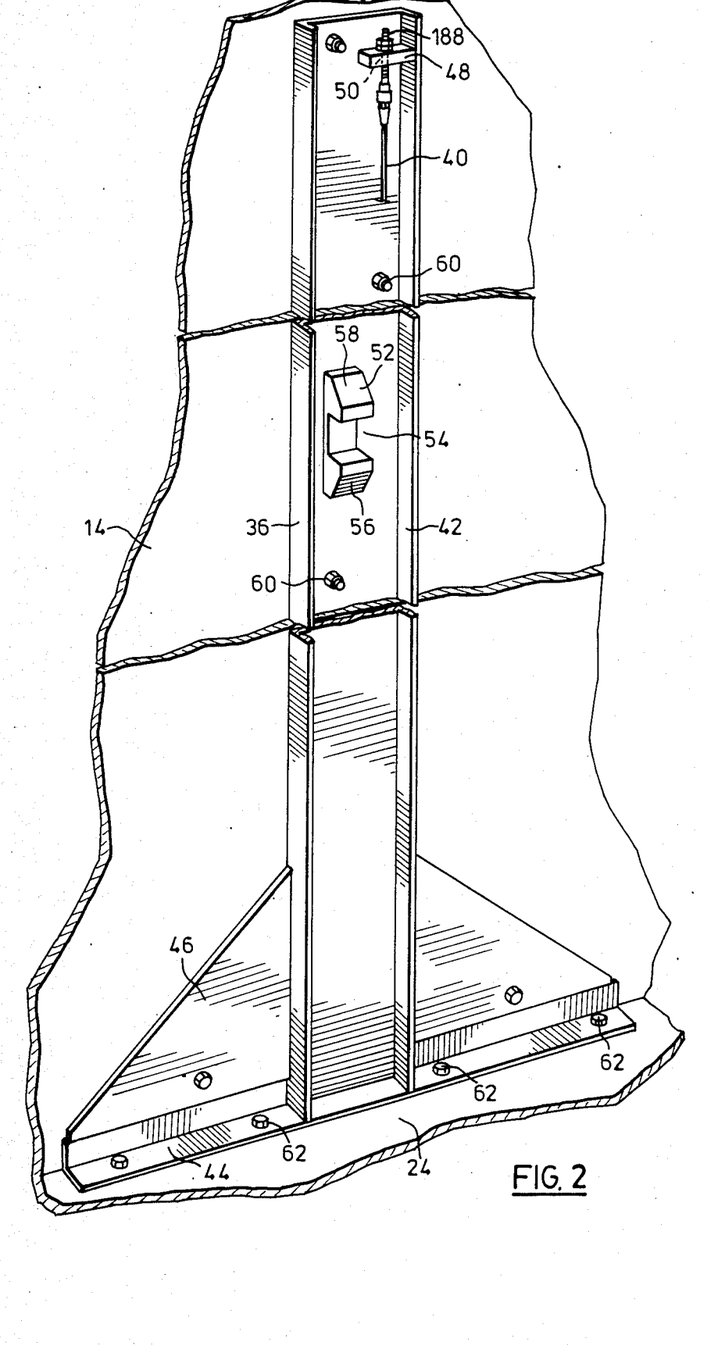
FIG. 2 is an enlarged pictorial view of one of the guide rails which are located in the van.

With reference to FIGS. 1 and 2 of the drawings, the reference numeral 10 refers generally to a transportation van body constructed in accordance with an embodiment of the present invention. The van body 10 has a floor 12, a pair of oppositely disposed upright side walls 14, a top wall 16, a front wall 18 and doors 20 which serve to enclose a cargo compartment 22. Access to the cargo compartment 22 is obtained through the open end 24 when the doors 20 are in the opened position. The van body is provided with road-going wheel sets 26.

The van body may be of any proportions and may measure as much as 48 ft. long by 13.5 ft. high by 8.6 ft. wide or more.

In the embodiments illustrated in FIG. 1 of the drawing, the van body is considered to have three distinct load transporting load lengths 28, 30 and 32 within each of which an elevator assembly generally identified by the reference numeral 34 is provided. Each elevator assembly comprises four upright guide rails 36 which are arranged two on each side wall 14, an elevator platform 38 and elevator cables 40 (FIG. 2).

As shown in FIG. 2, each of the upright guide rails 36 comprises a U-shaped channel member 42, an angle arm base member 44 and stiffening gusset plates 46. A cable mounting bracket 48 is mounted on each guide rail 36 adjacent the upper end thereof and has a cable mounting passage 50 opening therethrough. A latch plate 52 is mounted on each upright guide rail 36. Each latch plate 52 has a latch notch 54 which serves to receive the latching pins of the elevator platform as will be described hereinafter. The latch plates 52 are secured so that the latch notch 54 of each latch plate is positioned at the same height. The height at which the latching notch is located is determined by the height at which the elevator platform is to be located when in its load supporting elevated position. Each latch plate 54 has an upwardly and inwardly inclined up-ramp face 56 and a downwardly and inwardly inclined down-ramp face 58 which leads to the notch 54.

The guide columns 36 are secured to the side wall of the van by means of mounting bolts 60. The base 44 is secured to the floor 24 by means of mounting bolts 62.

Figure 3:
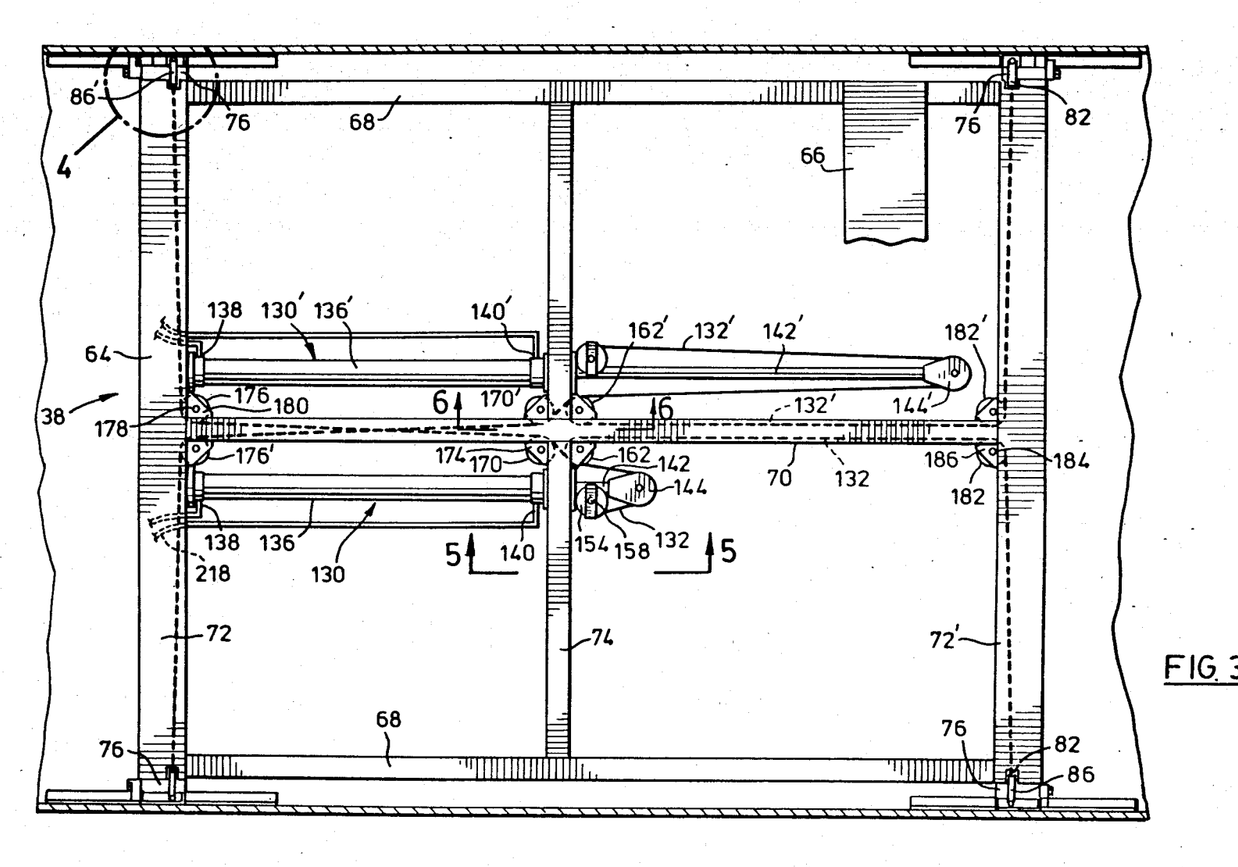
FIG. 3 is plan view of a platform, with the floor boards removed, taken in the direction of the arrows 3—3 of FIG. 1.

With reference to FIG. 3 of the drawings, it will be seen that the elevator platform 38 consists of an elevator frame 64 upon which a deck 66 is located. The elevator frame 64 consists of a pair of longitudinally extending side beams 68, a centrally located longitudinally extending beam 70, a pair of transversely extending end beams 72,72′ and a pair of transversely extending centrally located beams 74. The beams 72,72′ and 74 are of a rectangular box shaped cross-section and the beams 68, 70 and 74 are of a square box shaped cross-sectional configuration. A notch 82 is formed in the outer end of each end beam 72,72′.

An insert 76 (FIG. 4) is mounted in each open end of the transverse end beams 72. The insert is retained by means of mounting screws 78. The insert 76 consists of a body 80 which has a notch 84 which is aligned with the notch 82 when the body 80 is secured in the open end of the end beams 72,72′. A pulley 86 is mounted for free rotation on a shaft 88 which is secured with respect to the body 80 by means of a grub screw 90. The pulley 86 is spaced from the sides of the notch 84 by spacer plates 92. The axis 94 about which the pulley 86 is free to rotate, is located off-centre of the thickness of the body of the insert 80 so that the pulley is spaced inwardly from the lower face of the platform so that when the platform is in the lowered position, the pulley is spaced above the floor such that its free rotation is not prevented. A slot 95 is formed in the body 80 and extends longitudinally from the slot 84 to the inner end of the body to form a passage that permits the cable 40 to extend around the pulley 86 and through the body 80 into the interior of the beam 72. A bore 104 is also formed in and extends longitudinally through the body 80. A notch 97 is formed in the body and extends inwardly from the inner end 99 of the body and terminates at the end face 101.

Figure 4:
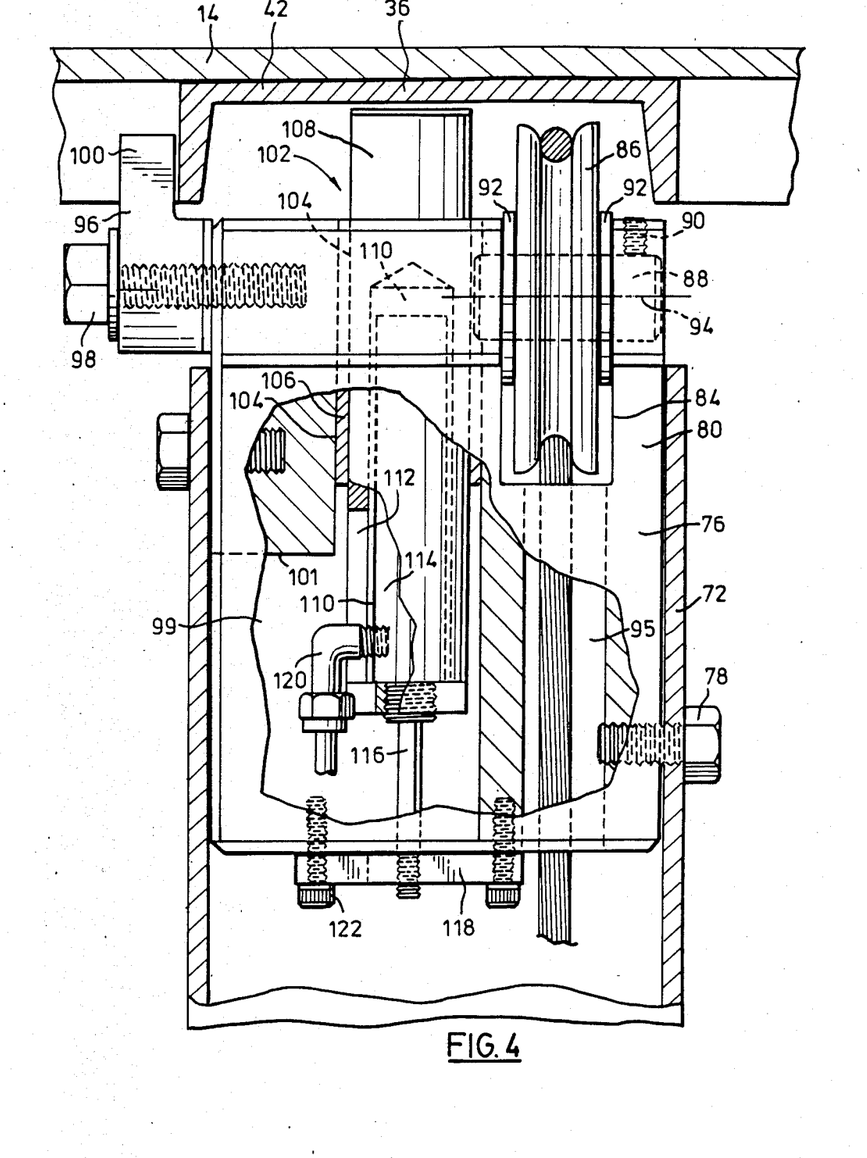
FIG. 4 is an enlarged detail of the encircled area 4 of FIG. 3.

For the purposes of retaining the elevator platform against longitudinal movement, retainer plates 96 are provided one at each outer side of the transfer beams 72,72′. The retainer plates 96 are secured to the body 80 by means of set screws 98. The retainer plates 96 each have a flange portion 100 which project laterally outwardly so as to be arranged in a face-to-face relationship with respect to the outer face of the side flange of the guide rails 36.

A latch assembly generally identified by the reference numeral 102 is located in the bore 104 of each body 80. A bearing in the form of a bush 106 is mounted in each bore 104. The latch pin 108 is slidably mounted in the bush 106. A bore 110 is formed in the latch pin 108. A U-shaped notch 112 opens through a portion of the side wall of the latch pin into the bore 110. A "Bimba" cylinder, which is manufactured by the Bimba Manufacturing Company, is used to drive the latch pin 108 to and fro. The "Bimba" cylinder includes a pneumatic cylinder 114 which has a threaded neck 119 and a stem 116 which extends through the neck 119. The stem 116 is moveable relative to the cylinder 114 in response to the supply of air to the cylinder 114. The stem 116 is threadedly mounted on an end plate 118 so the piston which is located in the pneumatic cylinder 114 is held stationary. The end plate 118 is secured to the inner end of the body 80 by means of mounting screws 122. An elbow coupling 120 connects the pneumatic cylinder 114 to a flexible air line 115 which is connected to a source of pressurized air which will be described hereinafter. The cylinder 114 is located in the bore 110 of the latch pin 108. The neck 119 of the cylinder 114 is threadedly mounted in the end plate 121 which is secured to the end of the latch pin 108. The internal biasing spring of the Bimba cylinder normally acts to extend the cylinder 114 with respect to the stem 116 and this in turn urges the latch pin 108 to the extended position shown in FIG. 4. By supplying air to the Bimba cylinder, the internal spring is compressed and the stem 116 is telescoped within the cylinder 114. This action serves to withdraw the latch pin 108 from the latch notch 54.

Figure 5:
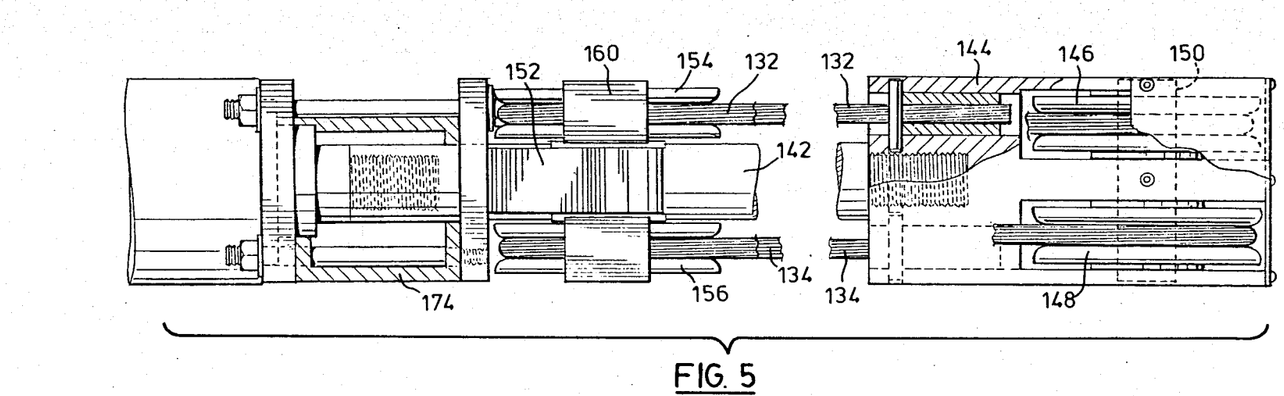
FIG. 5 is a side view of the pulley arrangement of the extensible rams taken in the direction of the arrows 5—5 of FIG. 4.
Figure 6:
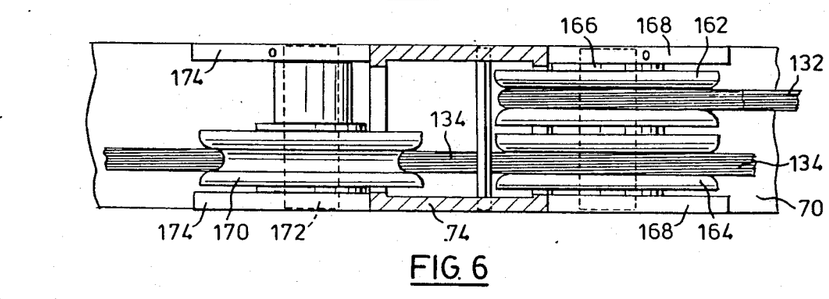
FIG. 6 is a sectional side view taken along the line 6—6 of FIG. 3.

In order to enhance the load lifting capacity of the platform without increasing the thickness of the platform, two extensible ram assemblies 130 and 130′ are provided. The ram assemblies 130 and 130′ are connected in parallel to the power source of hydraulic fluid and each serve to engage two elevator cables 132, 134 and 132′, 134′. The hydraulic ram assemblies 130 and 130′ are identical and like parts are identified by like numeral which are distinguished by the use of a (′) in association with the assembly 130′. The hydraulic ram assembly 130 has a stationary cylinder member 136 opposite ends of which are mounted on and supported by the transverse beams 72 and 74. The hydraulic cylinder 136 has inlet 138 and a rent outlet 140 at opposite ends thereof. A ram 142 is mounted for movement in the cylinder 136 between the retracted and extended positions shown in FIG. 3 of the drawings. A clevis 144 (FIG. 5) is mounted at the free end of the ram 142 and has sheaves 146 and 148 mounted for rotation therein on a shaft 150. A sheaf mounting bracket 152 is mounted on the central beam 74 and has sheaves 154 and 156 mounted thereon for rotation about the shaft 158. A retainer 160 is mounted on the shaft 158 and serve to retain a cable extending therethrough in use in a conventional manner. As shown in FIG. 6, a further set of sheaves 162 and 164 are mounted for rotation on a shaft 166 which is supported by support brackets 168 which are secured to the frame at a corner formed between the transverse beam 74 and the longitudinal central beam 70. An additional sheave 170 is mounted for rotation on a shaft 172 which is mounted in support brackets 174 which are located at an adjacent corner formed between the transverse beams 74 and the longitudinal beam 70. Yet another sheave 176 is mounted for rotation on a shaft 178 which is supported by support brackets 180. This sheave 176 is located in the corner formed between the longitudinal beam 70 and transverse end beam 72. On the opposite side of the longitudinal beam 72, that on which the sheave 170 is located. A further sheave 182 is mounted on a shaft 184 which is supported by support plates 186. This sheave 182 is located at the intersection formed between the longitudinal beam 70 and the transverse beam 72'.

As previously indicated, two elevator cables 132 and 134 are driven by each hydraulic ram assembly. The cables 132 and 134 have one end firmly secured to the clevis 144. The cable 132 extends from the clevis 144 around sheaves 154, 146, 162, 170, 176 and pulley 182 and has its other end connected by means of an adjustable connection 188 to the cable mounting bracket 148 of its associated upright support column. The cable 134 extends around the sheaves 156, 148, 164, 182 to the sheave 86' from which it extends to the mounting bracket 48 of the upright support column which it is associated with.

The cables 134 and 136 extend to support columns which are located at opposite corners of the elevator platform.

To raise the platform, hydraulic fluid is supplied to the hydraulic cylinders 136 and 136' to simultaneously extend the rams 142 and 142' to effectively wind in the cables 132 and 134 with respect to the platform. The rate at which the cables 132 and 134 are wound in will exceed the rate at which the rams are extended by a factor of 3 to 1 on the basis of the pulley arrangement provided. Thus it will be seen that a ram having a 42" stroke will provide a sufficient lift to lift the platform about 126". This is a sufficient lift to raise the platform to the elevated storage position assumed by the platform located in the second load transporting length 30 illustrated in FIG. 2.

Figure 7:
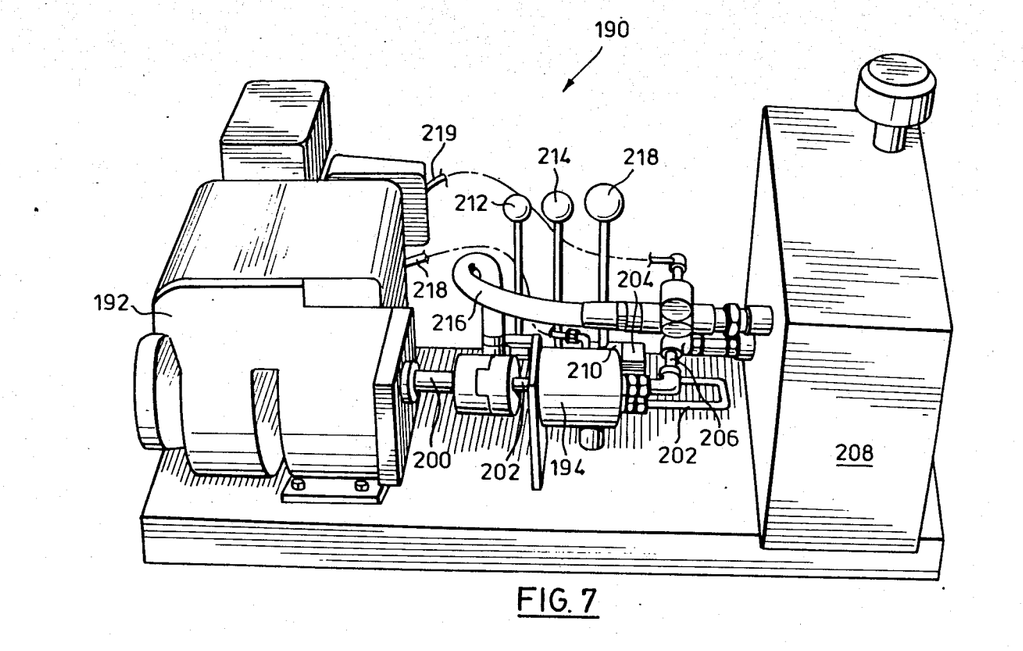
FIG. 7 is a pictorial view of a power source for driving the elevator platform.

The power source for the hydraulic rams is generally identified by the reference numeral 190 and is located in the forward end 191 of the load storage compartment. As shown in FIG. 7, the power source comprises a small internal combustion engine 192 which has an output shaft 200 which is connected to an input shaft 202 of a pump 194. The pump 194 has an output conduit 202 which is connected to a control valve 204. An input conduit 206 connects the pump 194 to a fluid storage tank 208. The valve 204 is a compound valve having a manifold chamber which is connected to a plurality of independently operable valve units 210, one for each lift platform. The valve units 210 have operating handles 212, 214 and 218. A return conduit 216 connects the manifold of the valve 204 to the storage tank 208 so that excess hydraulic fluid can be returned to the storage tank 208. The valve units 210, each have an output conduit 218 which is connected to an input 138 of a cylinder 136 of one of the lift platforms and a return conduit 220 which is connected to the output 140.

In use, the elevator platforms 38 of each of the load transporting lengths are initially located in the lowered position which is the position shown by the platform located in the load transporting length 30 (FIG. 1). An automobile or other payload item is then driven up the ramp through the open end of the van to be positioned on the load platform 38 of the load transporting length 30. The engine 192 of the power source is then started to drives the pump 194. The control lever 212 of the valve unit 210 which control the operation of the platform 38 of the load transporting length 32 is then moved to the position required to supply hydraulic fluid from the pump 194 through the conduit 216 to the platform 38 of the load transporting length 28. The supply of fluid to the platform 38 serves to simultaneously extend both rams 136 and 136' of the elevator platform thereby causing the platform to be elevated. The platform is elevated until the latching pins 108 engage with the notch 54 of the latch plate 52 at which point the supply of fluid to the rams is immediately interrupted by moving the control lever 212 of the valve 210 to the neutral position to permit the hydraulic fluid in the line 216 to vent through the manifold of the valve to return to the hydraulic fluid storage tank 208. A further load unit such as an automobile can then be located in the storage space provided below the partially elevated platform 38 of the load transporting length 32.

This process can then be repeated in each of the subsequent load transporting lengths 28 and 30 until the van is fully loaded. In some circumstances, it may be desirable to locate a single tall load unit in one or other of the load transporting lengths such as the length 30 shown in FIG. 1. In this application, the loading platform 38 is raised to its full height by fully extending the rams.

To lower the platform, compressed air is supplied to each of the latch mechanisms through air lines 240, 242, 244 and 246. This causes the latch pins to be withdrawn from the latch plates to release the platform which is then free to lower under its own weight or the combined weight of the platform and its load. The rate at which the platform is permitted to lower is regulated by the proportions of the inlet 138 which is selected to ensure that the rate at which the platform is permitted to lower is not excessive. Various modifications of the apparatus of the present invention will be apparent to those skilled in the art. In one modification, a latching plate may be provided at the upper end of each of the upright columns 36 for use in retaining the platform in the fully elevated position shown in the load transportation length 30 of FIG. 1.

An important feature of the structure of the platforms is that they are sufficiently thin to permit a vehicle to be driven across the floor of the van and onto a lowered platform without requiring the use of ramps. This is achieved by ensuring that the platforms have a height of no more than about 5 in. which is less than 5% of the height of the cargo compartment. This low profile platform has been obtained despite the fact that the power units for the platform are located in the platform by using two small diameter extensible rams rather than one larger diameter ram. A single ram could provide the power required to elevate the platform, however, the diameter of the single ram would prevent the manufacture of a low profile platform.

From the foregoing it will be apparent that because of the low profile of the elevator platform, it is possible to drive a vehicle or move a payload onto the platform when it is in the lowered position without requiring a recess or a well in the floor of the van body. For this reason, the elevator mechanism of the present invention is well suited for use in van bodies of the type which are widely used for transportation of goods by road. Furthermore, because all of the operating mechanisms of the present invention are housed within the cargo space, the mechanisms are not exposed to the wear and tear of the highway environment. These and other advantages of the present invention will be apparent to those skilled in the art.

The embodiments of the invention in which an exclusive property or privilege is claimed are defined as follows:

1. A transportation van comprising;

(a) a road going van body having a cargo compartment which is open at one end and which has a generally planar floor, a pair of oppositely disposed upright side walls and a top wall, (b) an elevator platform proportioned to extend across the cargo compartment between said side walls, said elevator platform having a drive compartment formed therein, (c) guide means mounted on said side walls and cooperating with said elevator platform for guiding the movement of the platform with respect to the compartment, (d) extensible ram means located in said drive compartment of said platform, one end of said ram means being secured to said platform and the other end being movable with respect to said platform, (e) elevator cable means having one end anchored with respect to said van body and its other end secured with respect to said elevator platform, said other end of said ram means engaging said elevator cables to cause said platform to move to and fro between a lowered position at the floor of the van, an intermediate position spaced above the floor and an upper position proximate the top wall of the cargo compartment, (f) latch means carried by said platform and operable to releaseably latch said platform in said intermediate position so as to be capable of supporting a load when locked in said intermediate position.

2. A transportation van as claimed in claim 1, wherein said elevator platform has a vertical height which is about 5% of the height of the cargo compartment.

3. A transportation van as claimed in claim 1, wherein said elevator cables extend around a pulley power train located in said drive compartment which serves to multiply the extension of the ram by a substantial factor so as to permit a short stroke ram to effect the large degree of movement required to elevate the platform between the lowered and raised positions.

4. A transportation van as claimed in claim 1, further comprising a self-propelled pumping unit located in said cargo compartment, said self-propelled pumping unit communicating with said extensible ram means to power said ram means and manually operable valve means for controlling the supply of hydraulic fluid to said ram means to extend and control said ram as required in use.

5. A transportation van as claimed in claim 1, wherein four elevator cables are provided, one at each corner of said platform, said extensible ram means comprising two hydraulic rams, each ram being drivingly connected to two of said cables to distribute the lifting load between said rams.

* * * * *